United States Patent
Meng

(10) Patent No.: US 9,375,114 B2
(45) Date of Patent: Jun. 28, 2016

(54) HOT BEVERAGE MAKER WITH CLEANING APPARATUS AND RELATED METHOD

(71) Applicant: Sunbeam Products, Inc., Boca Raton, FL (US)

(72) Inventor: Yao Qin Meng, Hui Zhou (CN)

(73) Assignee: Sunbeam Products, Inc., Boca Raton, FL (US)

( * ) Notice: Subject to any disclaimer, the term of this patent is extended or adjusted under 35 U.S.C. 154(b) by 138 days.

(21) Appl. No.: 14/284,755

(22) Filed: May 22, 2014

(65) Prior Publication Data

US 2014/0345652 A1    Nov. 27, 2014

Related U.S. Application Data

(60) Provisional application No. 61/826,113, filed on May 22, 2013.

(51) Int. Cl.
| | |
|---|---|
| *F04B 43/00* | (2006.01) |
| *F04B 45/02* | (2006.01) |
| *A47J 31/36* | (2006.01) |
| *A47J 31/60* | (2006.01) |

(52) U.S. Cl.
CPC .............. *A47J 31/60* (2013.01); *A47J 31/3695* (2013.01); *F04B 43/0054* (2013.01); *F04B 43/0063* (2013.01); *F04B 45/02* (2013.01)

(58) Field of Classification Search
CPC ................................ B05B 15/02; A47J 31/60
USPC ........................................... 134/166 C, 22.18
See application file for complete search history.

(56) References Cited

U.S. PATENT DOCUMENTS

| | | | |
|---|---|---|---|
| 3,390,626 | A | 7/1968 | Holstein et al. |
| 3,666,558 | A | 5/1972 | Pryor et al. |
| 4,211,156 | A | 7/1980 | Zimmermann |
| 8,468,934 | B2 | 6/2013 | Epars et al. |
| 2013/0112082 | A1 | 5/2013 | Baldo |
| 2013/0287914 | A1 | 10/2013 | Fragniere |

FOREIGN PATENT DOCUMENTS

WO        2013135901        9/2013

OTHER PUBLICATIONS

Keurig Brewer Top Needle Cleaning Maintenance Accessory; ebay.com; printed Feb. 18, 2016.*
Keurig Brewer Maintenance Accessory; keurig.com; printed Feb. 18, 2016.*
Keurig Brewer Maintenance Accessory; wayback machine; printed Feb. 18, 2016.*

* cited by examiner

*Primary Examiner* — Michael Barr
*Assistant Examiner* — Rita Adhlakha
(74) *Attorney, Agent, or Firm* — Michael J. Corrigan

(57) ABSTRACT

A hot beverage maker is provided with a removable pump for cleaning a brewing needle. The pump fits into a brewing chamber which normally receives a pod of an infusible beverage material. A pod receptacle and a lid pivotally connected to the housing form the brewing chamber, After a brewing cycle or when cleaning of the brewing needle is desired, an interior chamber of the pump is filled with cleaning fluid and the pump inserted into the pod receptacle. When the lid is closed, the brewing needle is inserted into the interior chamber. The lid is closed and released repeatedly to operate the pump. This creates a pumping action of the cleaning fluid through the brewing needle to dislodge a buildup of minerals or residual deposits. The used cleaning fluid and dislodged deposits are discarded after the cleaning operation is completed.

6 Claims, 6 Drawing Sheets

HOT BEVERAGE MAKER WITH CLEANING APPARATUS AND RELATED METHOD

RELATED APPLICATIONS

This application claims priority to U.S. provisional patent application No. 61/826,113 filed on May 22, 2013.

FIELD OF THE INVENTION

The present invention relates to hot beverage makers, and more particularly, to an apparatus for cleaning hot beverage makers and a related method of cleaning.

BACKGROUND OF THE INVENTION

Hot beverages makers for home use such as those for brewing coffee have become very popular. Many of the current hot beverage makers of this type use a disposable pod of pre-packaged beverage material inserted into the brewing chamber prior to a brewing operation. A brewing needle is typically forced into the pod to infuse hot water into the beverage material. The result is a brewed beverage that is further directed through an outlet port to a dispensing spout, and further to a drinking vessel such as a cup or mug. Unfortunately, with repeated use the brewing needle can become partially or tally obstructed by deposits leached out of the hot water flowing therethrough or residues from the beverage material created during the infusion process. in order to maintain the efficiency of the hot beverage maker, the brewing needle should be periodically flushed of accumulated deposits and residues.

SUMMARY OF THE INVENTION

In an embodiment, there is provided a hot beverage maker including a housing, a brewing chamber collectively formed from a pod receptacle and a lid pivotally connected to the housing, a brewing needle configured to brew a hot beverage through an infusible beverage material contained in a pod disposed in the pod receptacle, and a pump shaped and sized to fit within the pod receptacle. The pump is filled with cleaning fluid prior to being inserted into the pod receptacle and the pump is operated by repeatedly pressing and releasing the lid causing the cleaning fluid to be forced through the cleaning needle to release accumulated deposits.

In an embodiment, there is provided a hot beverage brewer including a housing, a brewing chamber collectively formed from a fixed cartridge receptacle and a lid pivotally connected to the housing, a brewing needle configured to infuse hot water with a beverage material contained in a cartridge disposed in the cartridge receptacle, and a bulb syringe pump shaped and sized to fit within the cartridge receptacle. The pump is filled with water prior to being inserted into the pod receptacle and the pump is operated by repeatedly pressing and releasing the lid causing the cleaning fluid to be forced through the cleaning needle to release accumulated deposits within the brewing needle.

In an embodiment, there is provided a pump including a body portion sized and shaped to fit within a pod receptacle of a beverage maker, a plurality of bellows forming the sidewall of the body portion, and an annular opening at a top end of the body portion leading into an interior chamber.

In an embodiment, there is provided a method of cleaning a hot beverage maker including the steps of filling an interior chamber of a pump with cleaning fluid, inserting the pump in a brewing chamber of the hot beverage maker, partially closing a lid of the hot beverage maker such that a brewing needle of the hot beverage maker is inserted into the interior chamber of the pump, and repeatedly closing and releasing the lid such that the pump is alternately compressed and decompressed causing a pumping action of the cleaning fluid through the brewing needle.

It should be understood that the present drawings are not necessarily to scale and that the embodiments disclosed herein are sometimes illustrated by fragmentary views. In certain instances, details which are not necessary for an understanding of the present invention or which render other details difficult to perceive may have been omitted. It should also be understood that the invention is not necessarily limited to the particular embodiments illustrated herein. Like numbers utilized throughout the various figures designate like or similar parts or structure.

DETAILED DESCRIPTION

Figure 1:
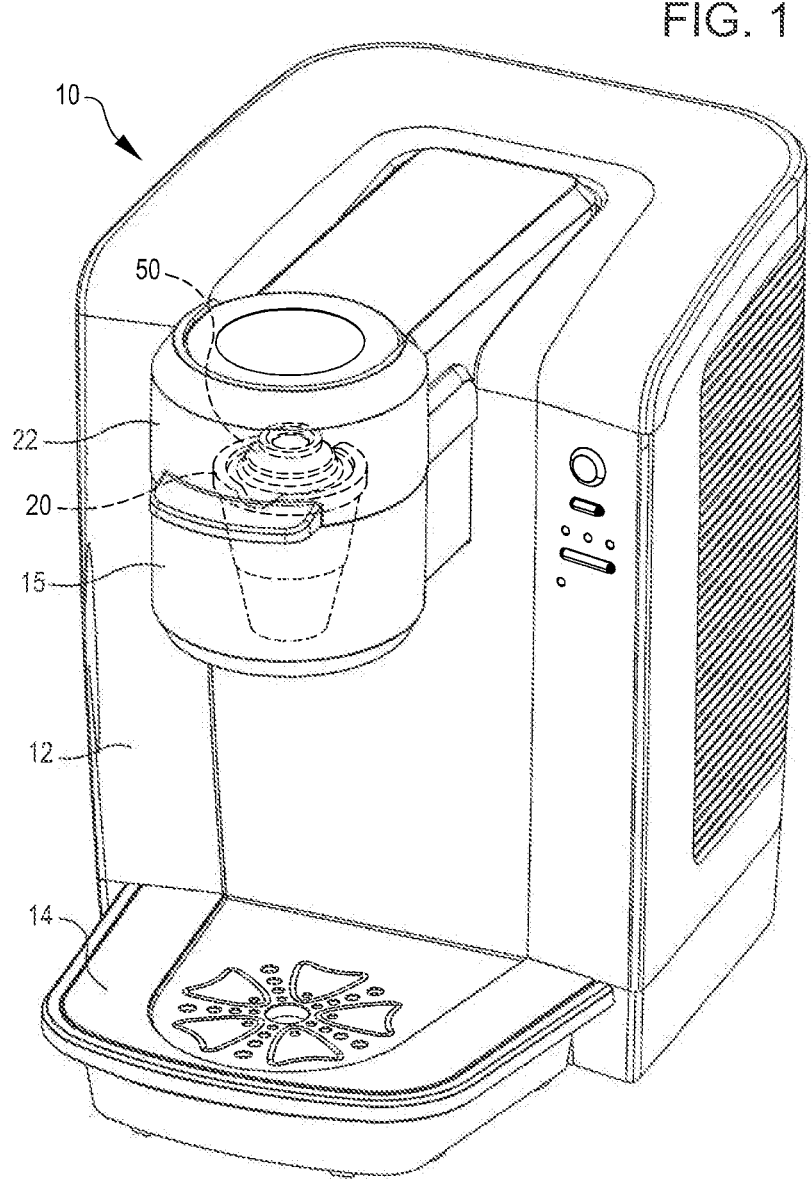
FIG. 1 is a perspective view of an embodiment of a hot beverage maker with a pump for cleaning installed in a beverage brewing chamber shown in dashed lines.
Figure 2:
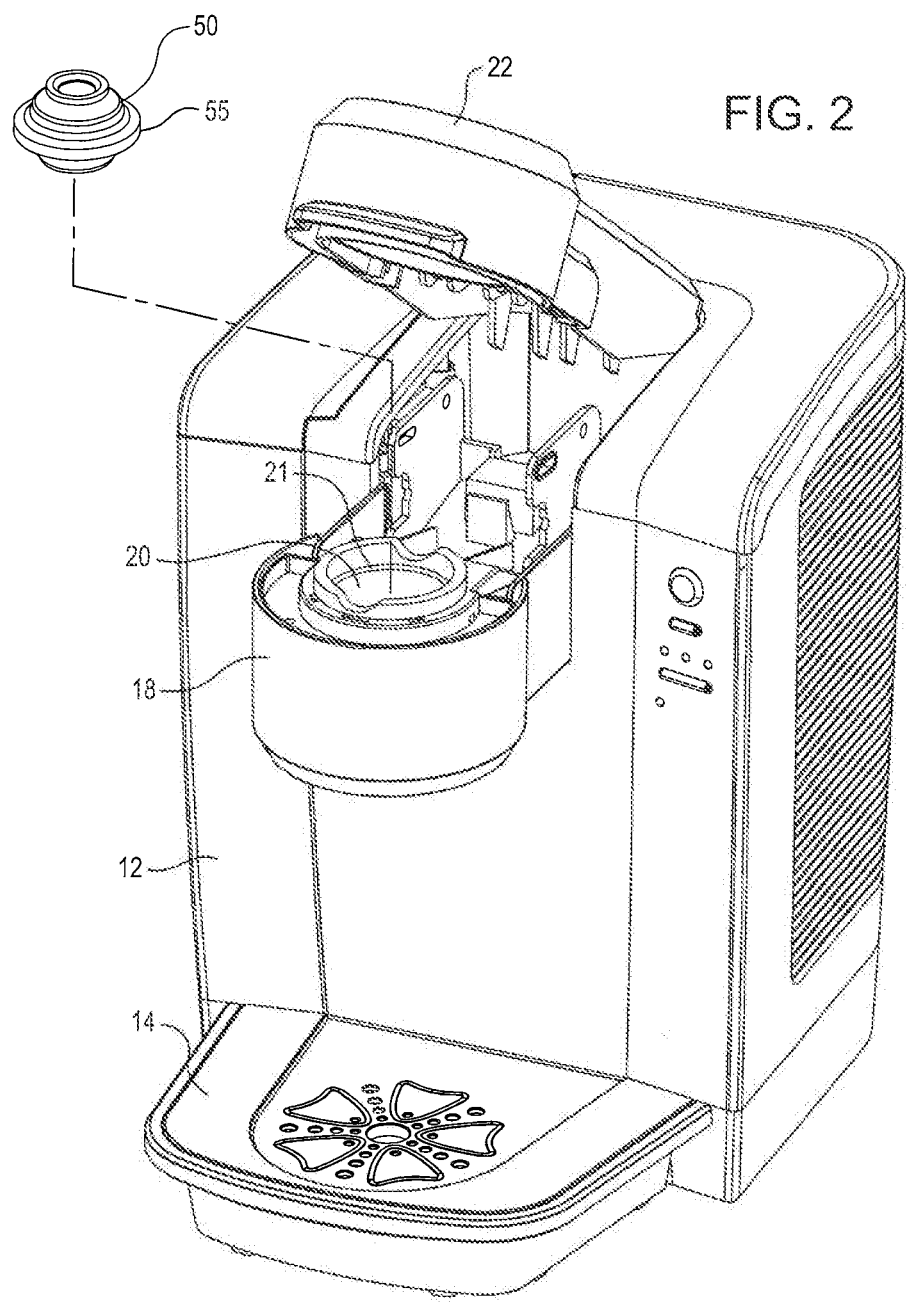
FIG. 2 is another perspective view of the hot beverage maker of FIG. 1 with a lid for a beverage brewing head in an open configuration and the pump removed from the beverage brewing chamber.

With reference initially to FIGS. 1-2, a hot beverage maker is shown at 10 having a housing 12 with a forwardly protruding shelf 14 arranged to support a cup or mug (not shown) for receiving a hot beverage, and in particular brewed coffee, espresso, cappuccino, latte, tea, hot water and the like, brewed by and dispensed from the hot beverage maker 10. In the illustrated embodiment, the beverage maker 10 is designed to brew a single serving of a brewed beverage using a disposable or reusable beverage pod (not shown) of a pre-packaged dosed amount of infusible beverage material such as coffee. Water under pressure or by gravity is directed to the beverage pod in the brewing chamber to brew a het beverage through the beverage material for further dispensing. In another embodiment of the invention, the beverage maker 10 may be designed to brew a single serving of a brewed beverage of varying brew strength or multiple servings of a brewed beverage of varying brew strength by using a beverage pod containing an infusible beverage material of a different dosage necessary for the single serving of varying brew strength or the multiple servings of the brewed beverage of varying brew strength.

The housing 12 contains components conventionally included in hot beverage makers of this type, including, inter alia, a brew head 15, water tank, heater, pump, electronic controls (on/off switch, timer, clock, LCD display), etc. These are well known to those skilled in the art, and thus not all of them have been illustrated, nor have all of them been described further in this specification. Suffice it to say that these components coact in response to the user's command to deliver a metered amount of heated water to a brewing chamber containing a pod packed with a dosed amount of infusible beverage material.

The brew head 15 includes a lower head portion 18 having a pod receptacle 20 and a lid 22, which collectively form the brewing chamber. The pod receptacle 20 has an open top configured and dimensioned to receive a beverage pod (not shown) containing a dosed amount of an infusible beverage material. The beverage pod (not shown) is preferably of the type disclosed, for example, in U.S. Pat. No. 5,840,189, the description of which is herein incorporated by reference. The beverage pod (not shown) may include an impermeable piercable container internally subdivided by a filter element into two compartments, one of Which contains the infusible beverage material. However, this is not meant to be limiting as there may be other types of beverage pods or cartridges that may be used containing an infusible beverage material.

Figure 4:
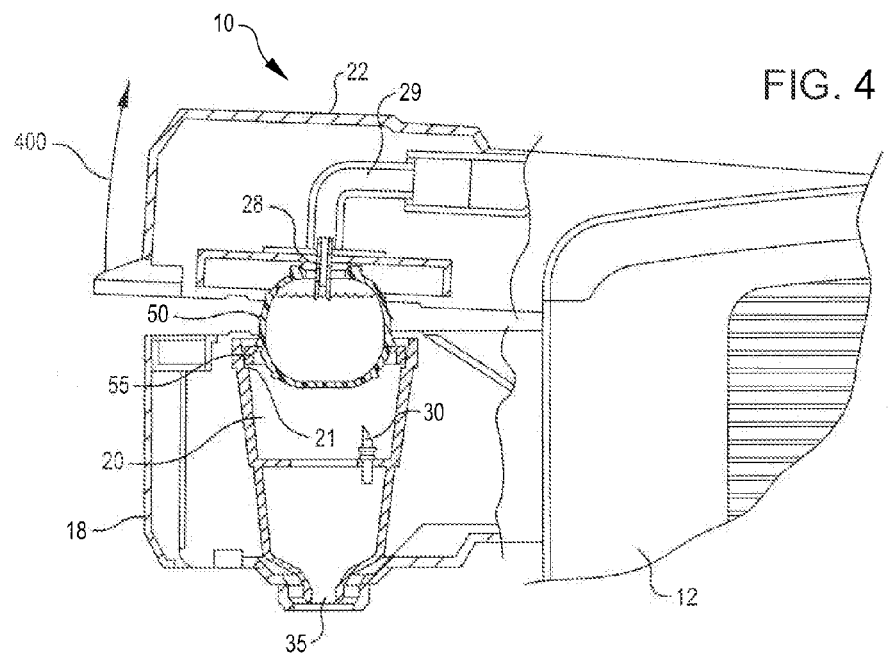
FIG. 4 is a partially cutaway cross-sectional view of the brew head of the hot beverage maker of FIG. 1 with the pump installed in the beverage brewing chamber and the lid in the open configuration.
Figure 5:
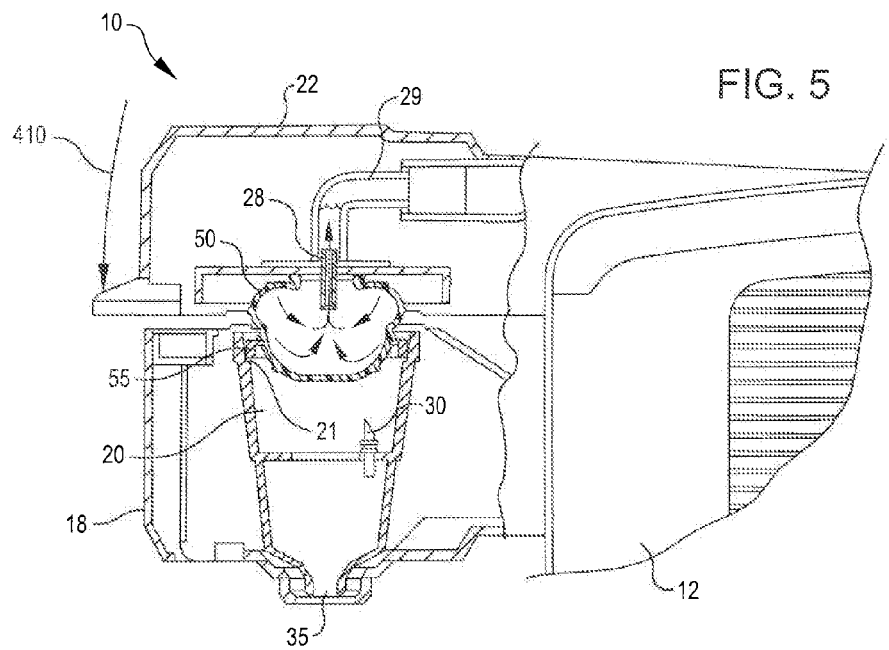
FIG. 5 is a partially cutaway cross-sectional view of the brew head of the hot beverage maker of FIG. 1 with the pump installed in the beverage brewing chamber and the lid in a closed configuration.
Figure 6:
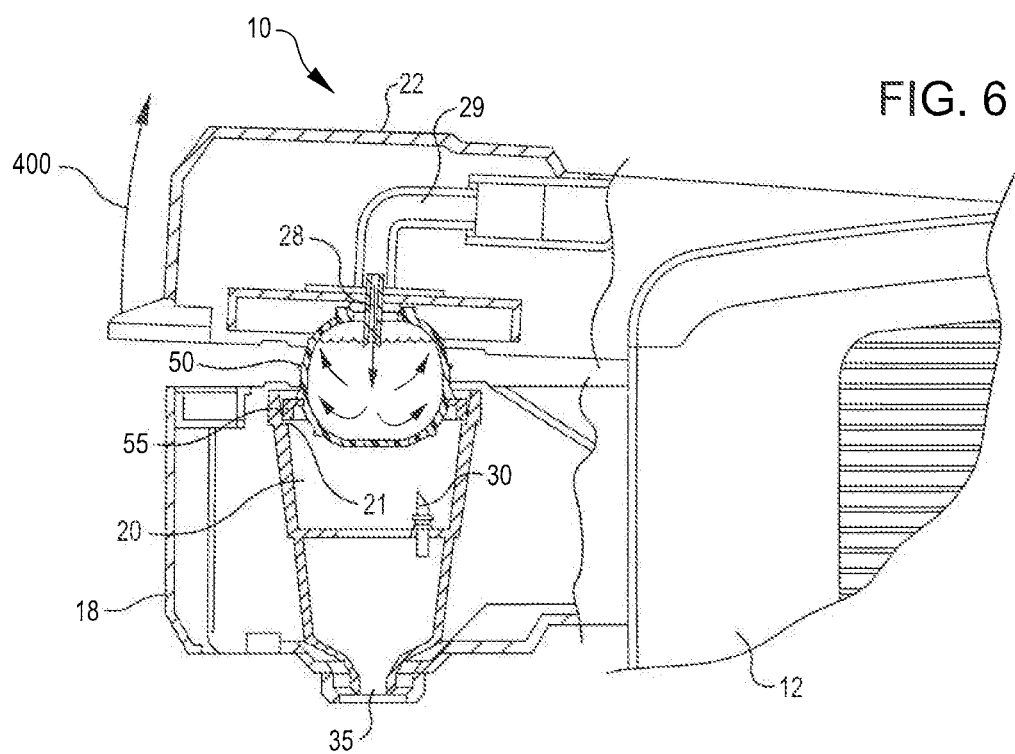
FIG. 6 is a partially cutaway cross-sectional view of the brew head of the beverage maker of FIG. 1 with the pump installed in the beverage brewing chamber and the lid again in the open configuration.
Figure 7:
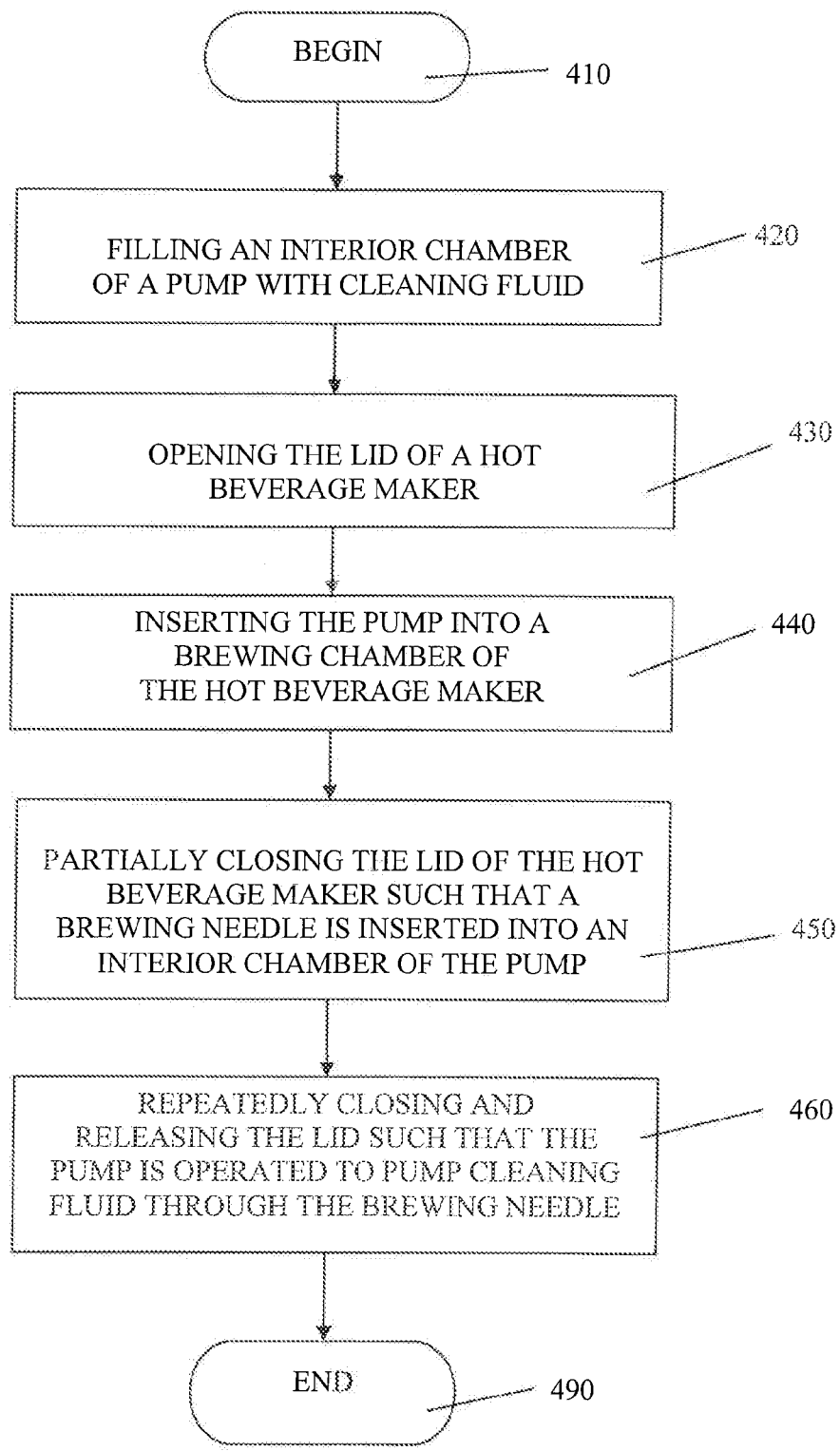
FIG. 7 is a flowchart of a method of cleaning the hot beverage maker of FIG. 1.

The lower head portion 18 containing the pod receptacle 20 is supported by the housing 12 in a fixed position. The lid 22 is pivotally connected to the housing 12 for pivotal movement about a lowered closed position, shown in FIGS. 1 and 5, and a raised open position. as shown in FIGS. 2, 4 and 6. The raised lid 22 allows access to the pod receptacle 20 for convenient insertion and removal of the beverage pod (not shown). The lowered lid 22 closes and cooperates with the pod receptacle 20 to enclose the beverage pod (not shown) during the brew cycle. As shown in FIGS. 4-6, the lid 22 carries a brewing needle 28 and the base of the pod receptacle 20 includes an outlet probe 30, The brewing needle 28 and the outlet probe 30 pierce the beverage pod (not shown) as the lid 22 is lowered to its closed position, thus accommodating a through flow of heated water into the beverage pod (not shown) via the brewing needle 28 for infusion with the beverage material contained in the beverage pod (not shown). The resulting brewed beverage exits via the outlet probe 30 for further delivery to the underlying cup or vessel (not shown) via a spout 35. The brewing needle 28 is fluidly connected to a conduit 29 that provides hot water from a hot water heater and pump assembly (not shown) controlled by electronic controls (not shown) disposed within the housing 12.

After every completed brewing cycle or after a selected number of brewing cycles, or as when needed, the brewing needle 28 may be cleaned using a manually operated bulb syringe pump 50 to remove accumulated deposits of minerals, mold, etc. from the hot water flowing therethrough during brewing or residues of infused beverage material that may backflow through the brewing needle 28 during brewing, The accumulated deposits of minerals and residues of beverage material may affect brewing performance by partially restricting or completely blocking the flow of the heated water during subsequent brewing cycles. In the illustrated embodiment, the pump 50 is a bulb syringe type pump specially sized and shaped to fit within the pod receptacle 20. However, this not meant to be limiting as other types of pumps may be used. The pump 50 and its operation for cleaning the brewing needle 28 is described more fully hereinbelow.

Figure 3:
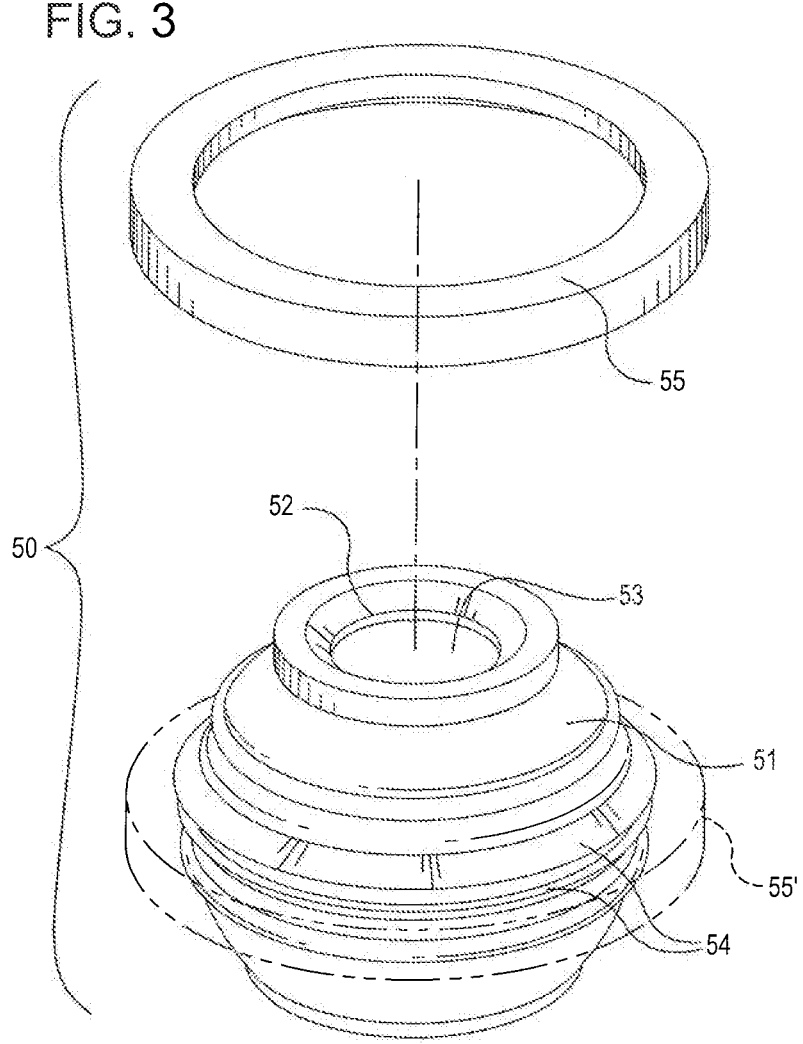
FIG. 3 is an enlarged exploded view of a pump and an associated annular support ring for supporting the pump within the beverage maker of FIG. 1.

In an embodiment and with particular reference to FIG. 3, the pump 50 is comprised of an annular shaped body portion 51 having sidewalls formed of a plurality of bellows 54. An annular opening 52 is formed at the top of the body portion 51 leading to an interior chamber 53 where cleaning fluid such as water for cleaning is directed before a cleaning operation of the brewing needle 28 is performed. It should be appreciated that any suitable cleaning fluid may be used including but not limited to water, vinegar, baking soda solutions, sanitizers, scale removers, etc.

The body portion 51 and the sidewall formed of the bellows 54 are comprised of a suitable elastomeric material including but not limited to plastic, rubber, silicone, etc. such that the body portion 51 and bellows 54 may be compressed and released to generate a pumping action of cleaning fluid disposed within the interior chamber 53. Any cleaning fluid that may be within the interior chamber 53 is ejected when the body portion 51 and bellows 54 are compressed. Alternately, when the body portion 51 and bellows 54 are released a suction is created within the interior chamber 53 and fluids may be drawn therewithin. An annular support ring or cover 55 made of a similar material such as an elastomer may be fitted around the bellows 54 to facilitate installation of the body portion 51 within the pod receptacle 20. The annular ring 55 is seated on a lip 21 of the pod receptacle 20. In use, the brewing needle 28 is inserted into the annular opening 52 leading into the interior chamber 53 so that as the body portion 51 and bellows 54 are compressed and released with the opening and closing of the lid 22 cleaning fluid is forced back and forth through the brewing needle 28 to dislodge accumulated deposits and residues.

In an embodiment, the brewing needle 28 may be cleaned using the pump 50 by the following method 400:

In step 410, the method 400 commences;

in step 420, filling the interior chamber 53 of the pump 50 with water or other cleaning fluid;

In step 430, moving lid 22 in the direction of arrow 400 to provide access to the pod receptacle 20 (see also FIG. 2);

In step 440, inserting the pump 50 into the pod receptacle 20 (FIG. 4) of the brewing chamber;

In step 450, moving the lid 22 in the direction of arrow 410 to a partially closed position (FIG. 4) such that a brewing needle 28 of the hot beverage maker 10 is inserted into the interior chamber 53 of the pump 50;

In step 460, moving the lid 22 in the direction of arrow 410 to a fully closed position to compress the pump 50 (FIG. 5), followed by releasing the lid 22 in the direction of arrow 400 to decompress the pump 50 (FIG. 6) in a number of repetitive cycles to pump water from within the interior of chamber 53 of the pump 50 (FIG. 4) through the brewing needle 28 into the conduit 29 to dislodge accumulated deposits (FIG. 5), and back through the brewing needle 28 into the interior chamber 53;

In step 470, opening the lid 22 fully in the direction of arrow 400 and removing the pump 50 from the pod receptacle 20;

In step 480, discarding from the pump 50 the cleaning fluid used to clean the brewing needle 28 along with the released mineral and beverage deposits dislodged from within the brewing needle 28; and In step 490, the method 400 ends.

Thus, there has been shown and described a hot beverage brewer using a pump for cleaning accumulated mineral and residual deposits of beverage material in the beverage brewing needle to maintain brewing performance, a pump and a related method. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used. in the sense of "optional" or "may include" and not as "required". Many changes, modifications, variations and other uses and applications of the present invention will, however, become apparent to those skilled in the art after considering the specification and the accompanying drawings. All such changes, modifications, variations and other uses and applications which do not depart from the spirit and scope of the invention are deemed to he covered by the invention which is limited only by the claims which follow.

What is claimed is:

1. A hot beverage maker, comprising:
    a housing;
    a brewing chamber collectively formed from a pod receptacle and a lid pivotally connected to the housing;
    a brewing needle configured to brew a hot beverage through an infusible beverage material contained in a pod disposed in the pod receptacle; and
    a pump shaped and sized to fit within the pod receptacle;
    wherein the pump is filled with cleaning fluid prior to being inserted into the pod receptacle and the pump is operated by repeatedly pressing and releasing the lid causing the cleaning fluid to be forced through the brewing needle to release accumulated deposits within the brewing needle.

2. The hot beverage maker of claim 1, the pump further comprising:
    a body portion having a sidewall comprised of a plurality of bellows; and
    an annular opening at a top end leading into an interior chamber.

3. The hot beverage maker of claim 1, wherein the pump is comprised of an elastomeric material.

4. The hot beverage maker of claim 1, wherein the infusible material is coffee.

5. The hot beverage maker of claim 1, wherein the hot beverage maker brews coffee, espresso, cappuccino, tea or latte.

6. The hot beverage maker of claim 1, wherein the cleaning fluid is water.

* * * * *